Sept. 26, 1933.  T. G. SHAWHAN  1,927,852
HUMIDIFYING UNIT FOR COLD STORAGE COMPARTMENTS
Filed May 12, 1932
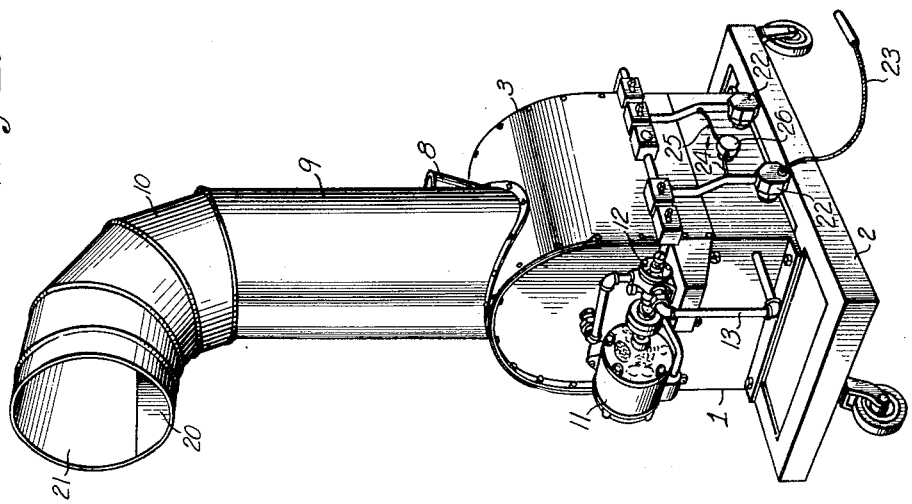
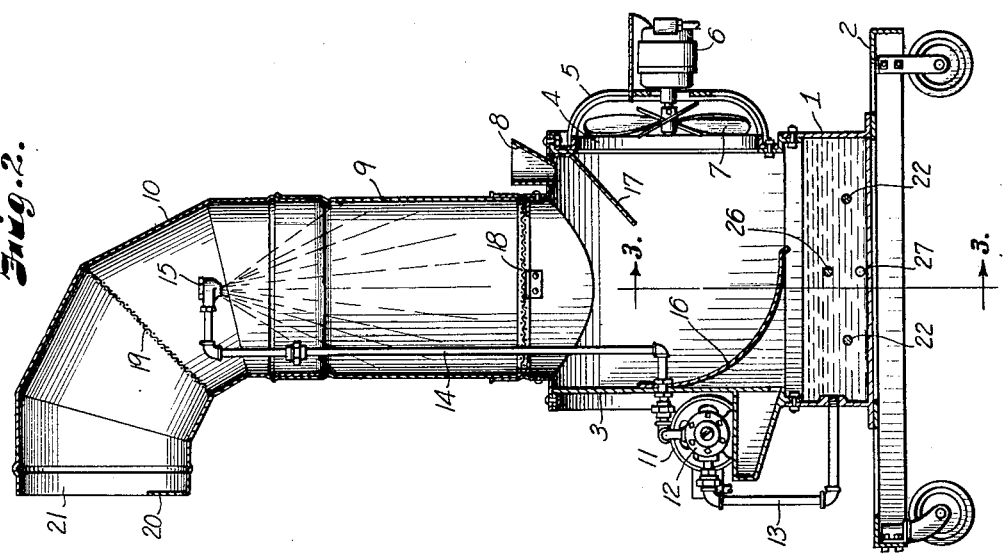
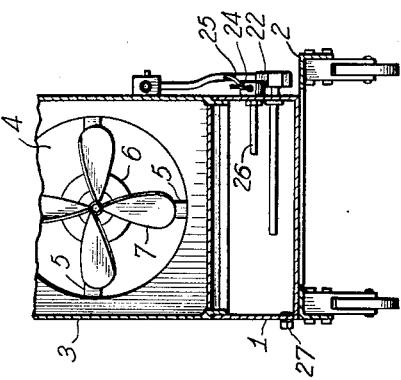
INVENTOR.
Thomas G. Shawhan
BY Thos. E. Scofield
ATTORNEY.

Patented Sept. 26, 1933

1,927,852

UNITED STATES PATENT OFFICE 1,927,852

HUMIDIFYING UNIT FOR COLD STORAGE COMPARTMENTS

Thomas G. Shawhan, Kansas City, Kans.

Application May 12, 1932. Serial No. 610,857

2 Claims. (Cl. 261—12)

My invention relates to a humidifier unit for cold storage compartments and more particularly to a unit which is self-contained and portable so that it may be used at any desired location.

Cold storage plants contain various foods which should be stored under different conditions of humidity. Eggs should be stored at a humidity between 76 and 78, while apples require a humidity of between 80 and 90. Frequently certain comestibles require a drier atmosphere. Carcasses which are warm and moist when brought into storage will give off quantities of moisture so that the storage room will rapidly become too humid. In this event, the atmosphere must be dehumidified in order to attain sanitary and proper storage conditions. Vegetables will wilt, losing weight and flavor if the air is of insufficient humidity. Eggs will lose in weight if stored in an atmosphere which is too dry.

In the devices of the prior art in which humidifiers have been used, the supply of moisture has been obtained from a water spray which was fed from a water main. These devices involve a large loss of water which is of considerable expense in a large plant. Then, too, due to the fact that the device which obtains its water from a water main must be connected thereto, a device of this nature is stationary and cannot be used with ease except in a fixed location in one storage room.

One object of my invention is to provide a humidifier for cold storage compartments of the circulating water type.

Another object of my invention is to provide a device for humidifying cold storage rooms in which the water is prevented from freezing.

Another object of my invention is to provide a humidifying device having a set of baffles which will prevent the deposition of free moisture within the storage compartment.

A further object of my invention is to provide a device which may be used optionally as a dehydrator when the atmosphere within the cold storage compartment is too humid.

Referring now to the drawing in which like reference numerals are used in the various views and which are to be read in conjunction with the accompanying specification and form part thereof:

Figure 1 is a perspective view of a humidifier embodying one mode of carrying out my invention.

Figure 2 is a sectional elevation of the embodiment shown in Figure 1.

Figure 3 is a fragmentary sectional view taken on the line 3—3 of Figure 2.

In general my invention contemplates the humidifying of air by its passage through a water spray. The water for the water spray is taken from a reservoir and pumped by a pump through a suitable spray or sprays through which the air passes and is permitted to fall back into the reservoir. Due to the fact that the temperature within the cold storage compartment is below the freezing point of water, in order to prevent the water from freezing not only in the reservoir but also on the sides of the air passages, I provide electric heating elements within the reservoir which serve to keep the water above the freezing temperature. In order to prevent the overheating of the water, I provide a thermostatic control element which will maintain the water at a point above the freezing temperature and will prevent it from becoming too warm.

More particularly referring now to the drawing, a reservoir 1 is mounted upon a suitable wheeled truck 2. A housing 3 is secured to the reservoir 1 and is provided with an air intake opening 4 in which is mounted a spider 5 carrying an electric motor 6 which drives a blower fan 7. The housing 3 is provided with a filling opening 8 into which the water is poured. It is to be understood, of course, that the reservoir 1 may be provided with a liquid level indicator of any suitable type such as a sight glass. Mounted upon the housing 3 is an upstanding cylindrical air duct 9 upon which is removably and adjustably mounted a cowl 10. A motor 11 is mounted upon the side of the housing 3 and drives a water circulation pump 12. Pipe 13 leads from the water reservoir 1 to the inlet of water circulation pump 12. The discharge of the pump 12 is connected to a line 14 which terminates in a spray nozzle 15 of any suitable type. Within the housing 3 are mounted suitable baffle plates 16 and 17. Baffle plate 16 directs the incoming air upwardly. Baffle plate 17 prevents water from the spray 15 or from the filling opening 8 from splashing out upon the floor.

Above the housing 3 and within the air duct 9 I mount a screen 18 which distributes the water from the spray 15 and effects an initial humidification of the outgoing air. Above the spray 15 and within the cowl 10 I mount a fine mesh screen 19 which will disengage any free water which may be carried along by the air stream. To insure that no free moisture is discharged from the cowl 10, I provide a traverse baffle plate 20 at the exit opening 21 of the cowl 10.

Within the reservoir 1 are mounted a plurality of hot point immersion heaters 22 which are connected to a suitable source of potential through leads 23. Connected in the circuit with the immersion heaters 22 through lines 24 and 25 is a thermostatic control element 26. The purpose of the thermostat 26 is to keep the water within the reservoir 1 from freezing and at the same time to slightly heat the water so that the water coming from the spray 15 will be of sufficient temperature to prevent the accumulation of ice upon the sides of the air duct 9 and upon the screen 18.

In operation, the reservoir 1 is filled with water to a suitable level, the motor 11 started causing pump 12 to take water from the reservoir 1 and force it through the spray 15. The motor 6 is then started, which operates blower fan 7 to set up an air circulation through the air duct 9 in contact with the water spray humidifying the air which issues from the cowl opening 21. The thermostat will keep the water at a proper temperature to prevent it from freezing.

In the event that the atmosphere is too humid and it is desired to dehumidify the same, the cowl 10 which is removable is removed and a tray of a dehydrating agent is placed upon the screen 18. The device is operated then by simply starting blower motor 6 and leaving pump motor 12 idle it being understood that the reservoir 1 has been drained through drain opening 27 before my device is used as a dehydrator.

In banana ripening rooms where a very humid atmosphere is desired and a higher temperature is necessary, I may set my thermostat so that the water will be heated to a high temperature which will give a very warm, humid atmosphere.

It will be seen that I have accomplished the objects of my invention. I have provided a portable, self-contained humidifying unit which may be used in any desired cold storage compartment. My device is of the circulating type and I am enabled to prepare a humid atmosphere without the expenditure of a great quantity of water. With my device, I have successfully kept cold storage compartments at the proper degree of humidity and have been able to evaporate twelve gallons of water per day.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a portable, cold-storage, humidifying unit, the combination including a movable support, a reservoir mounted on said support, a housing secured to said reservoir, said housing being provided with an opening, a blower fan mounted in said opening, an air duct communicating with said housing, a water spray positioned in said air duct, a pump adapted to circulate water from said reservoir to said spray, an adjustable cowl removably secured to said air duct, a baffle plate in said cowling, and means for automatically keeping the water in the reservoir above the freezing point.

2. The combination of claim 1 in which the reservoir is provided with a drain opening, a screen in said air duct adapted to support a water absorbing chemical, whereby air may be dried by passage through the air duct.

THOMAS G. SHAWHAN.